United States Patent [19]

Barker et al.

[11] Patent Number: 5,020,326
[45] Date of Patent: Jun. 4, 1991

[54] HYDRAULIC CONTROL SYSTEM WITH PREFILLED PRESSURIZED RESERVOIR

[75] Inventors: David C. Barker, Utica; Richard A. Nix, Auburn Hills; Keith V. Leigh-Monstevens, Troy, all of Mich.

[73] Assignee: Automotive Products plc, Warwickshire, England

[21] Appl. No.: 383,712

[22] Filed: Jul. 24, 1989

[51] Int. Cl.$^5$ .......................... B60T 11/26; F15B 7/08
[52] U.S. Cl. ........................................ 60/586; 60/592
[58] Field of Search ................. 60/583, 584, 585, 586, 60/592; 220/85 B

[56] References Cited

U.S. PATENT DOCUMENTS

| Re. 32,814 | 1/1989 | Leigh-Monstevens | 60/585 |
|---|---|---|---|
| 3,201,111 | 8/1965 | Afton | 220/85 BX |
| 3,216,198 | 11/1965 | Brooks | 220/85 B |
| 3,233,411 | 2/1966 | Schubert | 220/85 B |
| 4,407,125 | 6/1978 | Parsons | 60/585 |
| 4,503,678 | 3/1985 | Wimbush | 60/585 X |
| 4,590,765 | 7/1984 | Leigh-Monstevens | 60/585 |
| 4,599,860 | 7/1986 | Parsons | 60/584 |
| 4,607,670 | 8/1986 | Compton et al. | 60/584 X |
| 4,756,159 | 7/1988 | Compton et al. | 60/584 |
| 4,959,960 | 10/1990 | La Fountain | 60/533 |

FOREIGN PATENT DOCUMENTS 495751  11/1938  United Kingdom .................. 60/586

Primary Examiner—John T. Kwon
Assistant Examiner—John Ryznic
Attorney, Agent, or Firm—Krass & Young

[57] ABSTRACT

A reservoir construction for use with a hydraulic clutch actuator for a motor vehicle. The reservoir includes a blow molded bellows portion including a plurality of pleats or convolutions and is arranged to be moved to a stressed expanded condition in response to filling of the system so that the reservoir serves not only as a source of hydraulic fluid for the system but also serves to pressurize the system by virtue of its stressed condition. The reservoir may comprise a two-part assembly including a main body member and a lid closing the upper end of the main body member, in which case the system is filled through the upper end of the main body member, the lid is secured to the upper end of the main body member, and the output member of the associated slave cylinder is retracted to pressurize the system. Alternatively, the reservoir may comprise a single unitary member with a sealed upper end and the system may be filled and pressurized through a quick connect coupler secured to the free end of a conduit connected to the discharge end of the master cylinder assembly.

5 Claims, 3 Drawing Sheets

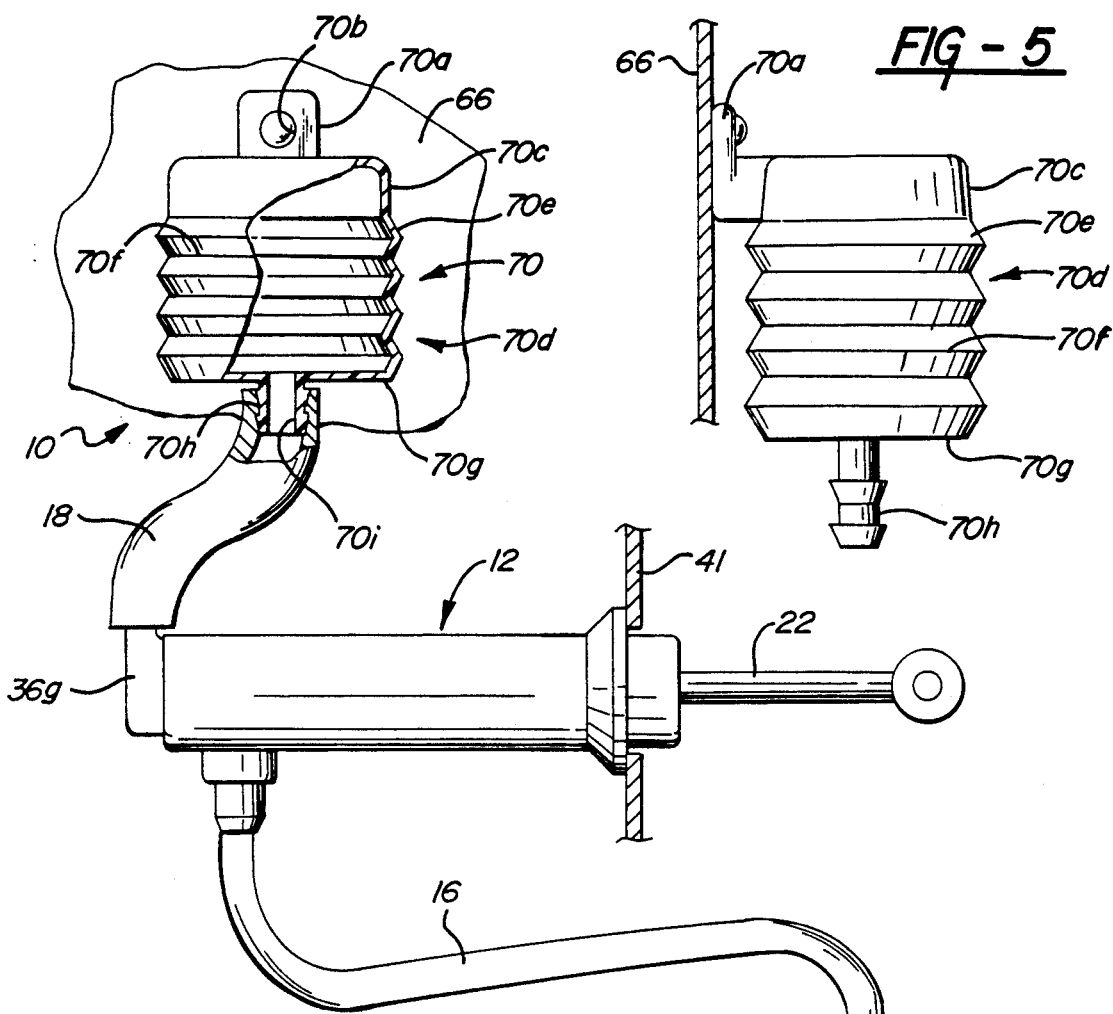
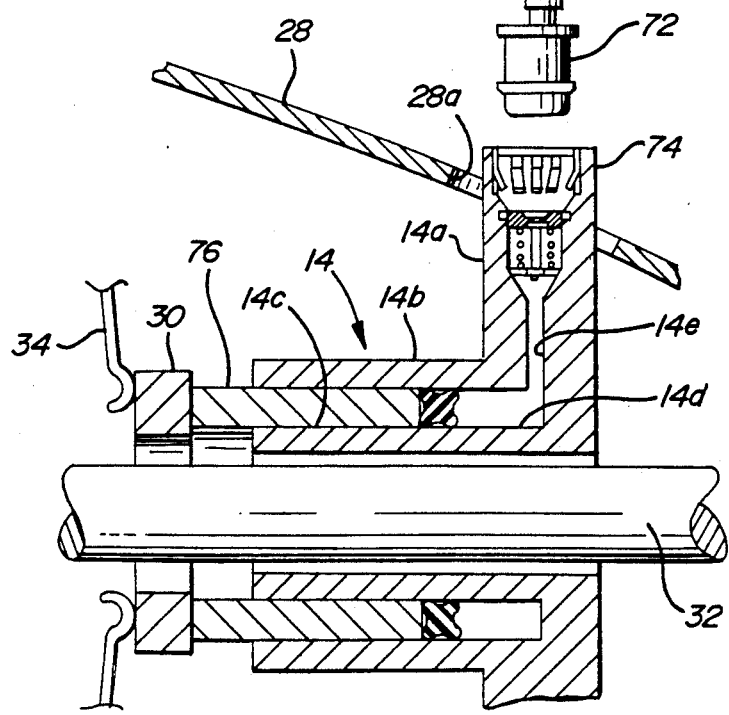

HYDRAULIC CONTROL SYSTEM WITH PREFILLED PRESSURIZED RESERVOIR

BACKGROUND OF THE INVENTION

This invention relates to a hydraulic control system and more particularly to hydraulic clutch actuators for use in motor vehicles.

Motor vehicle clutches originally were actuated by mechanical systems and, later, by hydraulic actuators including a master cylinder, a slave cylinder, and a conduit interconnecting the master and slave cylinder so that depression of the clutch pedal operates to discharge fluid from the master cylinder for delivery to the slave cylinder to move the output member of the slave cylinder outwardly to release the clutch.

Later, as shown for example in U.S. Pat. No. 4,599,860 assigned to the assignee of the present invention, the hydraulic clutch actuators were provided in a prefilled form to avoid filling of the apparatus on the vehicle assembly line with the prefilled apparatus including an expansible seal in the reservoir of the apparatus such that in the filled apparatus the seal is in contact with the fluid to prevent the ingestion of air into the apparatus but to permit the expansion and contraction of the fluid occurring in response to operation of the system, leakage in the system, and wear in the associated clutch assembly. Prefilled systems including an expansible seal in the reservoir have proven to be enormously successful and have virtually replaced hydraulic clutch actuators of the non prefilled type.

SUMMARY OF THE INVENTION

This invention is directed to the provision of an improved hydraulic control apparatus of the prefilled type especially suitable for use as a hydraulic clutch actuator.

More particularly, this invention is directed to the provision of a hydraulic prefilled clutch actuator having an improved means for providing an expansible seal in the system.

According to the invention, the hydraulic control system includes a cylinder housing defining a bore, a reservoir port and a discharge port, and a reservoir including a first end defining an opening in communication with the reservoir port, a second closed end remote from the reservoir port, and expansible side wall means between the ends of the reservoir to allow selective expansion and contraction of the reservoir. This arrangement provides an inexpensive reservoir which effectively serves to satisfy both the reservoir needs of the system and the expansible seal means of the system.

According to a further feature of the invention, the expansible side walls of the reservoir include pleats arranged to allow variations in the volume of the reservoir. This pleated arrangement provides a simple and effective means of providing the required expansibility of the reservoir.

According to a further aspect of the invention, the expansible reservoir has a relaxed state in which it defines a first volume and a stressed state in which it defines a second larger volume, and hydraulic fluid fills the hydraulic cylinder housing and the reservoir to an extent to maintain the reservoir in its stressed state so that the reservoir pressurizes the control system. Providing a positive pressure for the control system eliminates lost motion or slack in the system and improves the travel efficiency of the system.

According to a further feature of the invention, the expansible reservoir includes a unitary hollow member having a reservoir opening in communication with the reservoir port in the hydraulic cylinder housing and having a relaxed state in which it defines a first contracted volume and a stressed state in which it defines a second larger volume. This construction allows the reservoir to readily function both as a fluid storage means and a system pressurizing means.

In one embodiment of the invention, the unitary hollow member providing the reservoir further includes a filling opening remote from the reservoir opening and the system further includes a filling cap closing the filling opening. This arrangement allows the system to be filled through the filling opening of the reservoir and allows the reservoir to be thereafter sealed by the filling cap.

In another embodiment of the invention, the end of the reservoir remote from the reservoir opening is closed and the system further includes a quick connect coupling in communication with the discharge port of the cylinder housing. This arrangement allows the system to be filled through the quick connect coupler.

The invention also provides a method of providing a prefilled and pressurized hydraulic control system. According to the invention method, a cylinder housing is provided defining a central bore, a reservoir port and a discharge port; a piston is provided mounted for reciprocal movement in the bore of the cylinder housing; an expansible reservoir is mounted in communication with the reservoir port and has a relaxed state in which it defines a first volume and a stressed state in which it defines a second larger volume; and the system is filled with hydraulic fluid to an extent to move the reservoir from its relaxed to its stressed state so that the reservoir pressurizes the system. This method provides an efficient means of allowing a simple reservoir to serve both a fluid storage function and a system pressurizing function.

In one version of the invention method the filling step comprises introducing hydraulic fluid into the system through the discharge port of the cylinder housing.

According to a further aspect of this version of the invention method, the method includes the further step of providing a conduit connected at one end to the discharge port of the cylinder housing and having a quick connect coupler at its other end, and the filling step comprises introducing hydraulic fluid into the system through the quick connect coupler.

According to another version of the invention method, the method includes the further steps of forming the reservoir with a filling opening remote from the reservoir port, providing a slave cylinder having an inlet port and an output member, and providing a conduit extending between the discharge port and the inlet port; and the filling step comprises positioning the output member of the slave cylinder at a relatively extended position, filling the system through the filling opening, sealing the reservoir with a cap closing the filling opening, and moving the output member of the slave cylinder to a relatively retracted position to move the reservoir from its relaxed to its stressed state so that the reservoir pressurizes the system.

The invention also provides a method of providing a hydraulic clutch actuator system that maintains the system in a pressurized state irrespective of clutch wear. According to this aspect of the invention methodology, a master cylinder is provided including a housing defining a central piston bore, a reservoir port, and a discharge port; a slave cylinder is provided including an inlet port and an output member; the output member of the slave cylinder is positioned in driving relation to the release bearing of the associated clutch; a conduit is provided extending between the master cylinder discharge port and the slave cylinder inlet port; an expansible reservoir is provided in communication with the reservoir port and movable between a relaxed state in which it defines a relaxed volume and a series of progressively more stressed states in which it defines progressively larger volumes; and the system is filled with hydraulic fluid to an extent to move the reservoir from its relaxed to its stressed state so that the reservoir pressurizes the system and so that as the clutch wears and pushes fluid back into the system the reservoir moves to a progressively more stressed state so as to continuously pressurize the system irrespective of clutch wear.

BRIEF DESCRIPTION OF THE DRAWINGS

FIG. 4 is a view of a modified form of hydraulic control system;

FIG. 5 is a view of a reservoir employed in the hydraulic control system of FIG. 4;

DETAILED DESCRIPTION OF THE PREFERRED EMBODIMENTS

Figure 1:
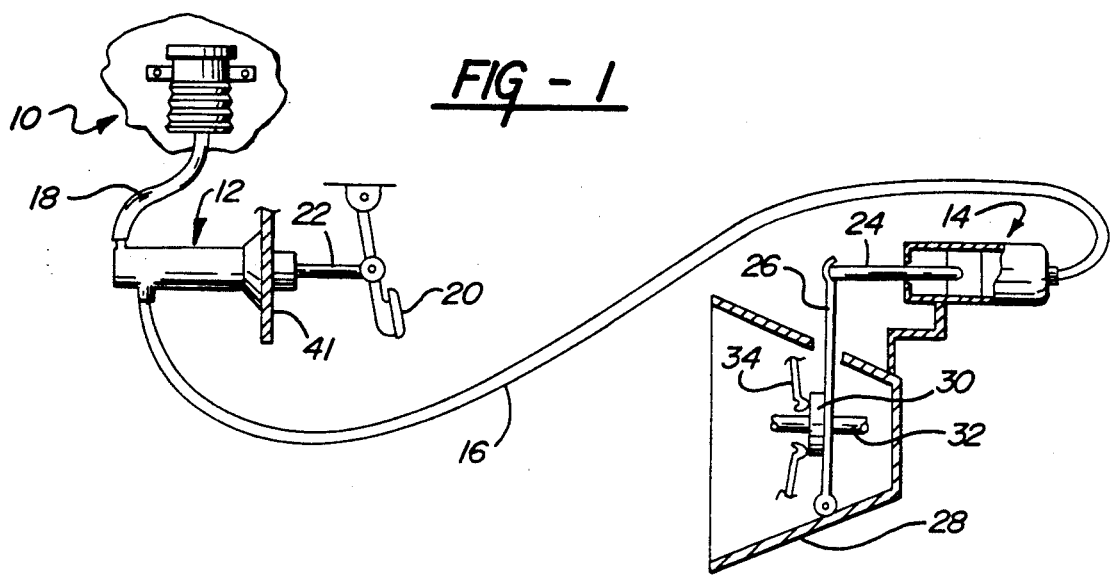
FIG. 1 is a schematic simplified view of a hydraulic control system according to the invention.
Figure 3:
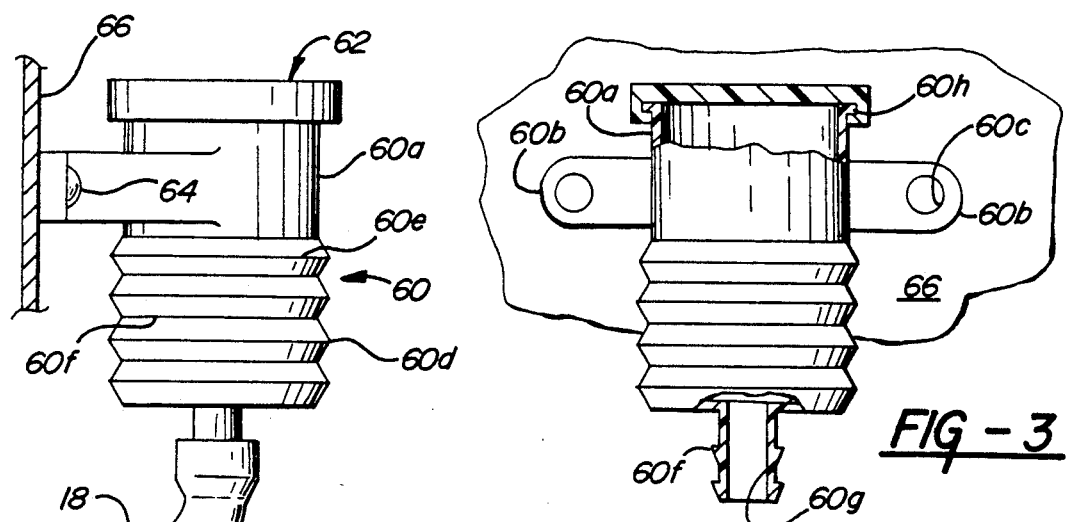
FIG. 3 is a detailed view of a reservoir utilized in the hydraulic control system of FIGS. 1 and 2.
Figure 2:
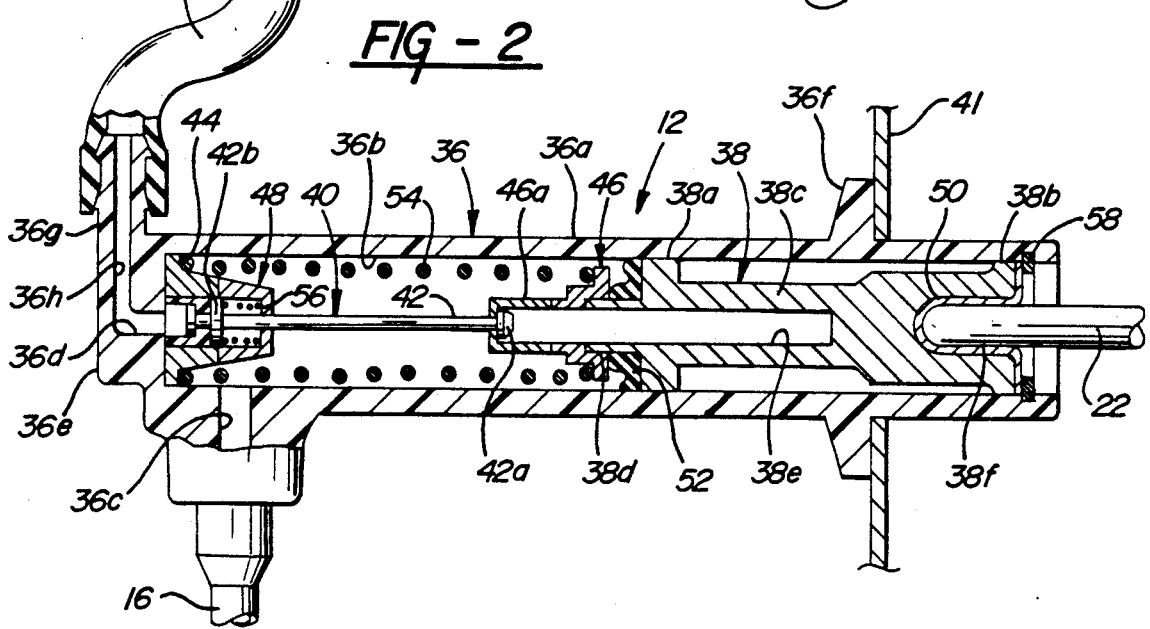
FIG. 2 is a view, partially in cross section, of a portion of the hydraulic control system of FIG. 1.

The hydraulic control system seen in FIGS.1-3 includes a master cylinder assembly 12, a slave cylinder assembly 14, a high pressure conduit 16 interconnecting the outlet of master cylinder 12 and the inlet of slave cylinder 14, and a low pressure conduit 18 interconnecting the outlet of reservoir 10 and the inlet of the master cylinder assembly 12. The invention hydraulic control system is intended for use in a motor vehicle wherein actuation of a clutch pedal 20 by the vehicle operator actuates the push rod 22 of the master cylinder assembly 12 to force pressurized fluid outwardly from cylinder assembly 12 through conduit 16 to slave cylinder 14 where the pressurized fluid acts to move output member 24 outwardly to actuate a clutch release lever 26. Clutch release lever 26 passes in known manner through a suitable opening in clutch bell housing 28 to operate a clutch release bearing 30 which is positioned in surrounding relation to clutch shaft 32 and which acts against clutch diaphragm spring fingers 34 to release the clutch in response to outward movement of slave cylinder output member 24 with the diaphragm spring fingers 34 acting in response to release of the clutch pedal 20 to return the clutch release lever 26 and thereby the master cylinder input rod 22 to their retracted positions corresponding to clutch reengagement.

Master cylinder assembly 12 is of the center feed type and includes a cylinder housing 36, a piston 38, and a valving assembly 40. Housing 36 includes a main body portion 36a defining a central piston bore 36b; a discharge port 36c; a reservoir port 36d in housing end wall 36e; a flange portion 36f for mounting the master cylinder assembly to a suitable bulkhead 41 such as the firewall of the vehicle; and a reservoir fitting 36g defining a central port 36h communicating with the reservoir port 36d in end wall 36e. Piston 38 includes a forward land portion 38a slidably engaging housing bore 36b; a rearward land portion 38b slidably engaging bore 36b; a central spool portion 38c interconnecting land portions 38a and 38b; a forward nose portion 38d; a central blind bore 38e opening in nose portion 38d; and a rearward blind bore 38f opening in the rearward end of the piston.

Valving assembly 40 includes a valve stem 42 including a rearward head portion 42a and a forward flange assembly 42b mounting an annular elastomeric member 44 arranged for sealing and valving coaction with reservoir port 36b.

Valve stem 42 is mounted at its rearward end by a valve stem retainer 46 press fit onto piston nose portion 38d and including a plurality of resilient fingers 46a engaging valve stem head portion 42a. The forward end of valve stem 42 is received in a valve guide member 48 positioned against housing end wall 36e in surrounding relation to reservoir port 36d.

In the assembled relation of the hydraulic cylinder assembly, piston 38 is slidably received in bore 36b; push rod 22 is received in an annular insert 50 positioned in piston blind bore 38f; an annular elastomeric seal 52 is positioned in an annular seal groove defined between piston forward land portion 38a and the rear portion of retainer 46; a return spring 54 extends within bore 36b between valve guide 48 and retainer 46 and operates to maintain the valve guide in position against the housing end wall 36a in surrounding relation to reservoir port 36d; elastomeric member 44 is maintained in spaced relation to reservoir port 36d by the engagement of fingers 46a of retainer 46 with head portion 42a of valve stem 42; an auxiliary spring 56 is positioned in retainer 48 in engagement with valve stem flange assembly 42b; and the piston is precluded from rearward movement out of bore 36b by a split ring 58 positioned in the open rearward end of the cylinder bore.

Further details of center feed hydraulic cylinder assembly 12 are shown in U.S. Pat. application Ser. No. 049,133 assigned to the assignee of the present application.

Reservoir assembly 10 includes a unitary main body member 60 and a lid member 62.

Main body member 60 is preferably formed of a polypropylene plastic material and is preferably formed in a blow molding operation, although other molding procedures such as rotational molding may also be employed to form the main body member 60.

Member 60 includes an upper generally cylindrical portion 60a, mounting ear portions 60b including mounting apertures 60c, and a lower bellows portion 60d including a series of convolutions or pleats 60e arranged with their crease lines 60f extending generally horizontal and generally parallel to each other. Member 60 is shown in a relaxed, contracted position in FIG. 2 and is shown in a stressed, expanded position in FIG. 3 wherein the bellows portion is elongated between its ends to increase the volume defined by the bellows portion with the increase in volume being accomplished by expanding the pleats or convolutions of the bellows against the resistance of the plastic material so that, in the absence of external forces, the bellows will return to the relaxed, relatively contracted configuration of FIG. 2 but may expand to the stressed configuration of FIG.

3 under the impetus of suitable forces. Member 60 further defines a discharge fitting 60f at its lower end forming a discharge opening 60g in communication with the hollow interior of the member 60.

Lid member 62 is also formed of a plastic material in a suitable molding operation and is intended to be snap fit over a flange portion 60h defined at the upper end of cylindrical portion 60a so that lid 62 seals the chamber defined within the unitary member 60. In its installed position in a motor vehicle, reservoir 10 is secured as by fasteners 64 to a suitable bracket or bulkhead 66 of the motor vehicle and conduit 18 is press fit at its upper end over reservoir discharge fitting 60f and press fit at its lower end over master cylinder reservoir fitting 36g so as to provide fluid communication between bore 36b of the master cylinder and the interior of the reservoir assembly.

The hydraulic control system of FIGS. 1–3, prior to delivery to the motor vehicle manufacturer, is suitably assembled to interconnect the reservoir assembly 10 to the master cylinder assembly 12 by the conduit 18 and to connect the master cylinder assembly 12 to the slave cylinder assembly 14 by the conduit 16; the system is evacuated by sucking air out of the system through the open end of reservoir member 60 with cap 62 removed; with slave cylinder output member 24 maintained in a relatively extended position, hydraulic fluid is introduced into the system through the open end of reservoir member 60 until the system, including the bore of the slave cylinder, conduit 16, the bore of the master cylinder, conduit 18, and the cavity defined by the unitary member 60 is totally filled with hydraulic fluid; the cap 62 is snap fit in position to seal the reservoir; and the output member 24 is moved to a relatively retracted position relative to the housing of the slave cylinder so as to force fluid back through the conduit 16, the master cylinder 12, and the conduit 18 into the reservoir assembly 10 so as to cause the bellows portion 60d of reservoir member 60 to move from its relaxed, contracted position as seen in FIG. 2 to a stressed, expanded position as seen in FIG. 3, whereafter the output member 24 is locked in its retracted position by a restraining strap or other means. The prefilled system is thereafter delivered to the motor vehicle manufacturer for installation as a clutch actuator.

To install the system in the motor vehicle as a clutch actuator 84c, master cylinder assembly 12 is secured to fire wall 41, reservoir assembly 10 is secured to bulkhead 66, and slave cylinder 14 is secured to bell housing 28 with output member 24 in driving engagement with clutch release lever 26.

Since reservoir portion 60d has been moved to its expanded, stressed condition as seen in FIG. 3, the reservoir serves to pressurize the system with the result that there is no lost motion or slack in the system so that the travel efficiency of the system is optimized and the system operates precisely and instantaneously in response to operation of the clutch pedal 20 to disengage the clutch. Furthermore, as the clutch wears with extended vehicle usage and the diaphragm spring fingers 34, in known manner, move to adjusted, worn positions to the right of the solid line position shown in FIG. 1, more and more hydraulic fluid is forced back up through the system and into the reservoir to further expand the bellows portion 60d of reservoir member 60 and further pressurize the system. The system may be designed for example to provide a pressure of 4 psi within the system with a new clutch and may provide a system pressure 10 psi with a fully worn clutch. It will be appreciated that the bellows portion 60d of the reservoir member 60 also functions in response to leakage in the system to maintain the system totally full irrespective of system leakage and further functions to expand and contract slightly in response to operation of the system to maintain the bore 36b of the piston in a totally liquid filled condition at all times.

The hydraulic control system of the FIGS. 4 and 5 embodiment includes a reservoir 10, a hydraulic cylinder assembly 12, a slave cylinder 14, a conduit 16 interconnecting the slave cylinder and the master cylinder, and a conduit 18 interconnecting the master cylinder and the reservoir.

Master cylinder assembly 12 is of the center feed type and is identical to the master cylinder assembly described with reference to the FIGS. 1–3 embodiment.

Reservoir 10 in the FIGS. 4 and 5 embodiment is formed as a single unitary member 70 and is preferably formed of a polypropylene plastic in a blow molding operation.

Unitary member 70 includes an upper mounting lug portion 70a defining a mounting aperture 70b; an upper generally cylindrical portion 70c; and a lower bellows portion 70d comprising a series of convolutions of pleats 70e having their crease lines 70f arranged in generally parallel, horizontal relation. The lower wall 70g of bellows portion 70d defines a discharge fitting 70h defining a discharge port 70i, and bellows portion 70d is movable between the relaxed contracted position seen in FIG. 4 and an expanded, stressed condition seen in FIG. 5 in which the pleats 70e have been moved to a relatively expanded disposition to elongate the bellows portion between its ends and increase the volume defined within the bellows portion. It will be understood that the bellows portion 70d in the expanded state or condition seen in FIG. 5 is stressed and wants to return to the relaxed, contracted configuration of FIG. 4 and will do so in the absence of forces maintaining it in the stressed, expanded position of FIG. 5.

Hose 18 fits at its upper end over reservoir discharge fitting 70h and fits at its lower end over the reservoir fitting 36g of the master cylinder assembly.

Conduit 16 is coupled at its upper end to the discharge port 36c of the master cylinder assembly and is fitted at its lower free end with a male quick connect coupler 72.

Slave cylinder 14 is of the concentric type and may be formed, as shown, with an integral, radially extending lug portion 14a positioned at its upper end in an opening 28a in housing 28. Slave cylinder 14 further includes inner and outer cylindrical portions 14b and 14c defining a piston chamber 14d therebetween and further includes a radial passage 14e in lug portion 14a communicating at its lower end with chamber 14d and communicating at its upper end with a female quick connect coupler 74 intended for coaction with male quick connect coupler 72. It will be understood that coupler 72, 74 are of the type in which they define a central bore which is normally closed but in which the couplings coact in response to insertion of the male coupler into the female coupler to open the bores defined by the couplers and provide communication between conduit 16 and passage 14e so as to allow hydraulic fluid to be discharged from master cylinder 12 for delivery to slave cylinder 14. Quick connect couplers 72, 74 may for example be of the type shown in detail in U.S. Pat.

application Ser. No. 312,435 assigned to the assignee of the present application.

Slave cylinder 14 further includes an annular piston 76 received in chamber 14d and acting against release bearing 30 to move the release bearing against diaphragm spring fingers 34 of the clutch in response to introduction of hydraulic fluid into chamber 14d in response to depression of clutch pedal 20 by the motor vehicle operator.

The hydraulic control system of the FIGS. 4 and 5 embodiment is delivered to the motor vehicle manufacturer in a modular, prefilled form. Specifically, reservoir 10, conduit 18, master cylinder 12, conduit 16 and coupler 72 are assembled: the assembled module is evacuated through the quick connect coupler 72, and the module is filled with hydraulic fluid through the quick connect coupler 72 with the hydraulic fluid being supplied under pressure and to an extent to move the reservoir unitary member 70 from the relaxed position seen in FIG. 4 to the stressed position seen in FIG. 5 so that the unitary member 70 serves not only as a fluid supply source for the module but also serves to pressurize the module by virtue of the stressed state in which the unitary member 70 is maintained.

The slave cylinder module 14 is now evacuated and filled through quick connect coupler 74 and the prefilled modules are delivered to a motor vehicle manufacturer where the master cylinder assembly is mounted to the firewall 41, the reservoir is mounted to a suitable bulkhead 66, the concentric slave cylinder is installed in surrounding relation to the clutch shaft 32 with the piston 76 in driving engagement with the release bearing 30, and quick connect male coupler 72 is inserted into quick connect female coupler 74 to provide a prefilled and pressurized hydraulic control system serving as a clutch actuator for the clutch of the vehicle.

As with the hydraulic control system of the FIGS. 1-3 embodiment, the reservoir of the installed hydraulic control system of FIGS. 4 and 5 serves not only as a source of fluid for the system but also serves to pressurize the system so as to eliminate any slack or lost motion in the system. The reservoir also functions to maintain the system in a pressurized state irrespective of wear in the associated clutch and also provides the required expansion and contraction of the system in response to leakage of the system and in response to operation of the system.

Figure 6:
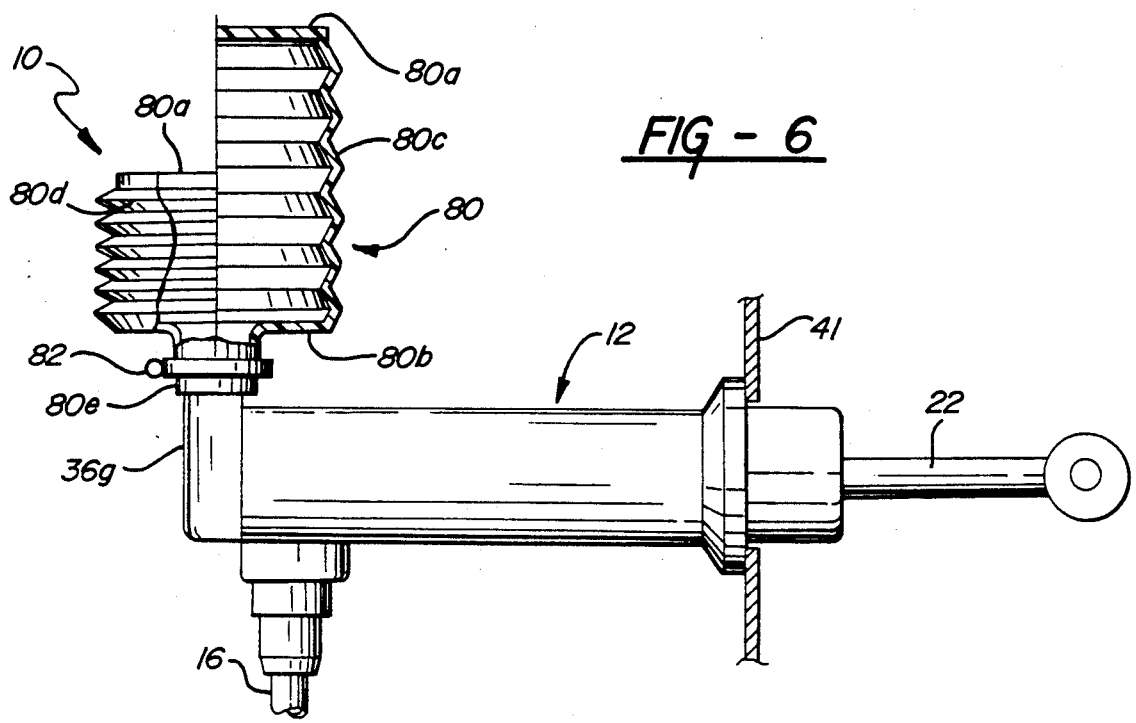
FIG. 6 is a view of a further modified form of hydraulic control system.

The hydraulic control system seen in FIG. 6 generally corresponds to the system seen in FIGS. 4 and 5 with the exception that the reservoir assembly 10, rather than being remote from the hydraulic cylinder assembly 12, is mounted directly to the hydraulic cylinder assembly 12.

The reservoir assembly 10 in the FIG. 6 embodiment comprises a single unitary member 80 formed of a polypropylene plastic material, preferably in a blow molding operation. Unitary member 80 includes an upper end wall 80a, a lower end wall 80b, and a series of convolutions or pleats 80c between the end walls and each including pleat lines 80d extending generally horizontally and parallel to each other. The lower end of member 80 defines a fitting 80e designed to be fit over master cylinder reservoir fitting 36g and maintained in position on fitting 36g by a suitable clamp 82. It will be understood that the hydraulic control system of FIG. 6 is intended to be utilized in conjunction with a male quick connect coupler 72 secured to the free end of conduit 16 with the coupler coacting with a female quick connect coupler 74 defined by a concentric slave cylinder 14 positioned in surrounding relation to the clutch shaft 32 of the vehicle.

The hydraulic control system of FIG. 6 is delivered to the motor vehicle manufacturer in a modular, prefilled form. Specifically, the reservoir 10, master cylinder 12, conduit 16, and coupler 72 are assembled, the assembled module is evacuated through the quick connect coupler 72, and the module is filled with hydraulic fluid through the quick connect coupler 72 to an extent to move the unitary reservoir member 80 from the relaxed, contracted configuration seen at the left of FIG. 6 to the expanded, stressed condition seen at the right of FIG. 6 so that the reservoir member 80 serves not only as a source of hydraulic fluid for the module but also serves to pressurize the module by virtue of the stressed state of the member 80.

The slave cylinder module 14 is now evacuated and filled through quick connect coupler 74 and the prefilled modules are deliver to a motor vehicle manufacturer where the master cylinder assembly 12, carrying the reservoir 10, is mounted to the firewall 41, the concentric slave cylinder is installed in surrounding relation to the clutch shaft 32 with the piston 76 in driving engagement with the release bearing 30, and quick connect male coupler 72 is inserted into quick connect female coupler 74 to provide a prefilled and pressurized hydraulic control system serving as a clutch actuator for the clutch of the vehicle.

As with the previous embodiments, following installation of the system in the motor vehicle, the reservoir unitary member 80 serves as a source of hydraulic fluid for the system, serves to pressurize the system by virtue of the stressed state of the unitary member 80, serves to maintain the system in a pressurized state irrespective of wear in the clutch, and serves to provide the required expansion and contraction of the system in response to leakage in the system and normal operation of the system.

Figure 7:
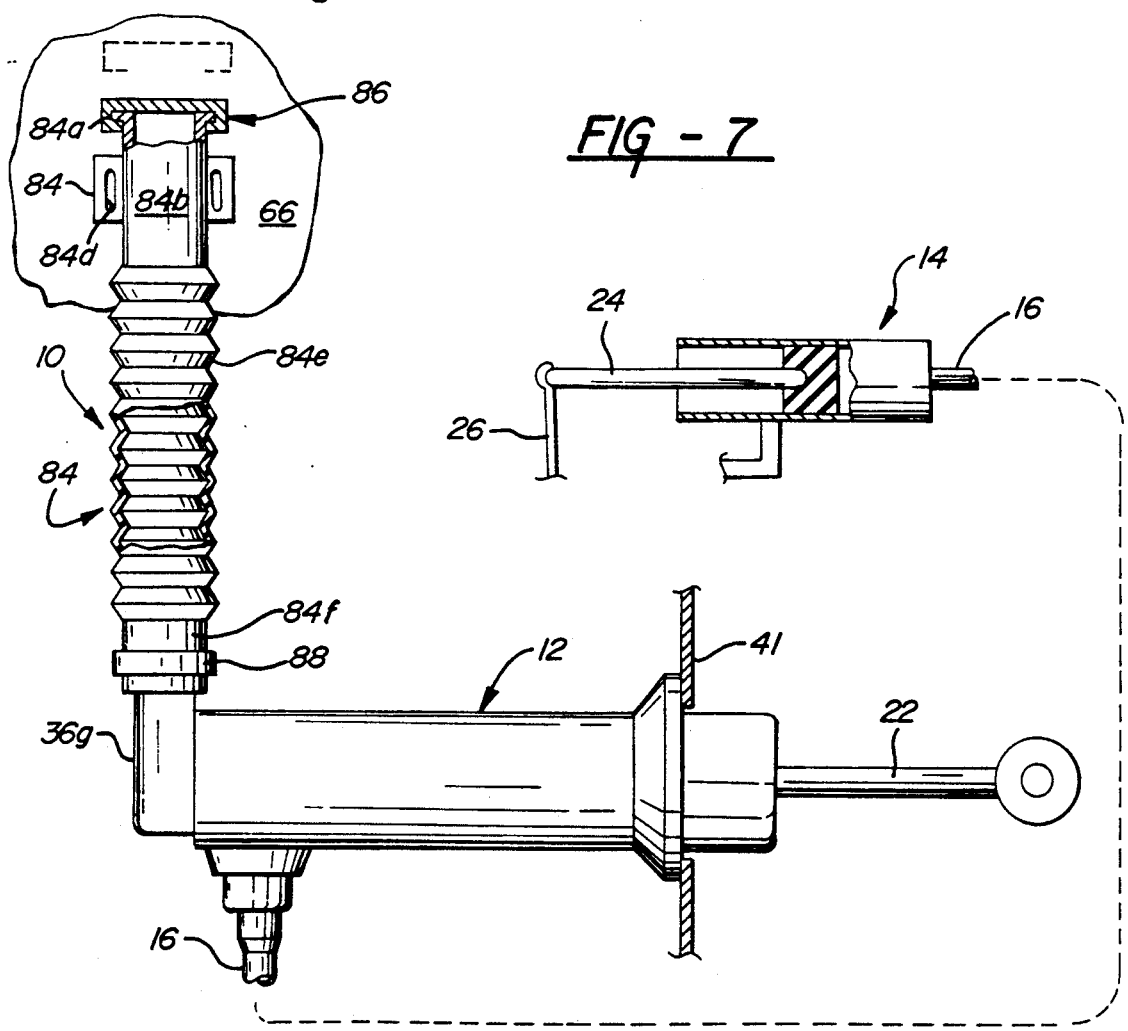
FIG. 7 is a view of a still further modified form of hydraulic control system.

The hydraulic control system seen in FIG. 7 is generally similar to the system seen in FIG. 6 with the exception that the reservoir assembly is a two-part assembly including a unitary blow molded polypropylene member 84 and a plastic lid 86, and the conduit 16 is connected directly, without quick connect, to a slave cylinder assembly 14.

Unitary member 84 includes an upper flange portion 84a, an upper tubular portion 84b including mounting lugs or ears 84c defining vertically elongated mounting slots 84d, an elongated hose-like pleated portion 84e, and a lower mounting portion 84f adapted to be fitted over the reservoir fitting 36g of the master cylinder assembly and held thereto by a suitable clamp 88. The upper end of the member 84 is adapted to be positioned against a bulkhead 66 of the vehicle by suitable fasteners (not shown) passing through elongated mounting apertures 84d.

The hydraulic control system of the FIG. 7 embodiment is delivered to the motor vehicle manufacturer in a prefilled and pressurized form. Specifically, with the lid removed from unitary reservoir 84 and the output member 24 of the slave cylinder 14 maintained in a relatively extended position, the hydraulic system is evacuated through the open upper end of unitary member 84 and hydraulic fluid is introduced into the open upper end of the member 84 until the entire system is filled, whereafter lid 86 is positioned over flange 84a to seal the interior of member 84 and output member 24 of the slave cylinder is moved to a relatively retracted position to force fluid back up through the system through conduit 16 and master cylinder 12 into the hollow of unitary member 84 whereby to move the member from the relaxed relatively contracted position seen in FIG. 7 to an expanded, stressed condition (as shown by the dotted lines in FIG. 7) in which the unitary member 84 acts to exert a pressure on the fluid in the system.

It will be understood that, following the installation of the system in a motor vehicle with the master cylinder assembly 12 secured to firewall 41, reservoir assembly 10 mounted on bulkhead 66, and slave cylinder assembly 14 mounted on bell housing 28, the elongated slots 84d and the coacting fasteners allow the unitary member 84 to expand and contract between relatively relaxed contracted positions and relatively stressed expanded positions while precluding lateral displacement of the unitary member 84 relative to the bulkhead 66.

As with the previous embodiments, the unitary member 84, with the hydraulic system installed in a motor vehicle, serves not only as a source of hydraulic fluid for the system but also serves to pressurize the system, further serves to maintain the system in a pressurized state irrespective of wear in the associated clutch, and further serves to provide the required expansion and contraction of the system in response to leakage in the system, and normal operation of the system.

It will be seen that, in each of the embodiments, the reservoir serves not only as a source of hydraulic fluid for the system, but also serves to maintain the system in a constantly pressurized state so as to take up slack or lost motion in the system and provide a precise, positive action for the system. The reservoir of the invention also functions in all of the disclosed embodiments to maintain the system in a pressurized state irrespective of wear occurring in the associated clutch and further provides an expansible seal for the system to provide the necessary expansion and contraction of the system to compensate for leakage in the system and to allow normal operation of the system. The reservoir constructions disclosed in the various embodiments, by virtue of their simplicity and amenability to blow molding, also represent a significant cost saving as compared to prior art reservoir systems.

Whereas preferred embodiments of the invention have been described in detail it will be apparent that various changes may be made in the disclosed embodiments without departing from the scope or spirit from the invention.

We claim:

1. A method of providing a prefilled and pressurized hydraulic control system comprising the steps of:
   providing a cylinder housing defining a central bore, a reservoir port, and a discharge port;
   providing a piston mounted for reciprocal movement in said central bore;
   providing an expandable reservoir in communication with said reservoir port and having a relaxed state in which it defines a first volume and a stressed stated in which it defines a second, larger volume; and
   introducing hydraulic fluid into said system through said discharge port and thereby filling said system with hydraulic fluid to an extent to move said reservoir from its relaxed to its stressed state so that said reservoir pressurizes said system.

2. A method according to claim 1 wherein:
   the method includes the further step of providing a conduit connected at one end thereof to said discharge port and having a quick connect coupler at its other end; and
   said filling step comprises introducing hydraulic fluid into said system through said quick connect coupler.

3. A method of providing a prefilled and pressurized hydraulic control system comprising the steps of:
   providing a cylinder housing defining a central bore, a reservoir port, and a discharge port;
   providing a piston mounted for reciprocal movement in said central bore;
   providing an expandable reservoir in communication with said reservoir port and having a relaxed state in which it defines a first volume and a stressed state in which it defines a second, larger volume;
   forming said reservoir with a filling opening remote from said reservoir port;
   providing a slave cylinder having an inlet port and an output member;
   providing a conduit extending between said discharge port and said inlet port;
   positioning said output member in a relatively extended position;
   filling said system through said filling opening;
   sealing said filling opening; and
   thereafter moving said output member to a relatively retracted position to move said reservoir from its relaxed to its stressed state so that said reservoir pressurizes said system.

4. A motor vehicle hydraulic control system comprising a master cylinder, a fluid reservoir connected to the master cylinder, a slave cylinder, and a conduit connecting the slave cylinder and master cylinder, the system being prefilled with hydraulic fluid prior to installation on the vehicle, wherein the reservoir has an expandable sidewall portion to allow the internal volume of the reservoir to expand when filled with hydraulic fluid from a contracted state to an expanded stressed state and wherein the reservoir volume change between the contracted state and the stressed state is substantially equal to the volume of fluid displaced from the slave cylinder when it goes from an expanded to a retracted position.

5. A method of providing a prefilled and pressurized hydraulic control system comprising the steps of:
   providing a control system comprising a master cylinder, an expandable reservoir connected to the master cylinder, a slave cylinder, and a conduit connecting the slave cylinder to the master cylinder;
   filling the control system and reservoir with hydraulic fluid with the reservoir in a contracted state and the slave cylinder in an expanded state;
   sealing the reservoir; and
   causing the slave cylinder to take up a retracted position and thereby forcing hydraulic fluid back into the sealed reservoir to cause the reservoir to take up an expanded condition in which it is stressed and pressurizes said system.

* * * * *